(12) United States Patent
Shinozaki et al.

(10) Patent No.: US 7,945,749 B2
(45) Date of Patent: May 17, 2011

(54) DATA MIRRORING METHOD

(75) Inventors: Yoshinari Shinozaki, Kawasaki (JP); Hideaki Omura, Kawasaki (JP); Koji Uchida, Kawasaki (JP); Mihoko Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1021 days.

(21) Appl. No.: 11/529,394

(22) Filed: Sep. 29, 2006

(65) Prior Publication Data

US 2007/0146788 A1    Jun. 28, 2007

(30) Foreign Application Priority Data

Dec. 27, 2005  (JP) ................................. 2005-375063

(51) Int. Cl.
*G06F 12/00* (2006.01)

(52) U.S. Cl. . 711/162; 711/161; 711/114; 711/E12.002; 714/15

(58) Field of Classification Search ........................ None
See application file for complete search history.

(56) References Cited

U.S. PATENT DOCUMENTS

| | | | | |
|---|---|---|---|---|
| 5,835,953 A * | 11/1998 | Ohran | ............................ | 711/162 |
| 7,546,485 B2 * | 6/2009 | Cochran et al. | ................. | 714/15 |
| 2003/0126107 A1 * | 7/2003 | Yamagami | ........................ | 707/1 |
| 2003/0177321 A1 * | 9/2003 | Watanabe | ...................... | 711/161 |
| 2005/0125609 A1 * | 6/2005 | Satoyama et al. | ............ | 711/114 |
| 2005/0228957 A1 * | 10/2005 | Satoyama et al. | ............ | 711/162 |
| 2006/0015946 A1 * | 1/2006 | Yagawa | ........................... | 726/32 |

FOREIGN PATENT DOCUMENTS

| | | |
|---|---|---|
| JP | 2003-173240 | 6/2003 |
| JP | 2004-185644 | 7/2004 |

* cited by examiner

*Primary Examiner* — Reginald G Bragdon
*Assistant Examiner* — Arvind Talukdar
(74) *Attorney, Agent, or Firm* — Staas & Halsey LLP

(57) ABSTRACT

A copy source device includes bit map acquisition and bit map merge functions. In accordance with bit-map management information in which a bit map indicating the presence of written data is rounded, the bit map acquisition and bit map merger acquires required bit map from a copy destination device, and merges the acquired bit map to a corresponding bit map of the copy source device. The copy destination device includes bit-map management information updater. The bit-map management information updater updates bit-map management information indicating a write operation when the write operation has been performed during a copy suspend mode. During a copy resume mode, the copy source device requests the copy destination device to transfer the bit-map management information, and in response, the copy destination device transfers the bit-map management information.

8 Claims, 14 Drawing Sheets

THE MANAGEMENT INFORMATION IS CLEARED AFTER MERGING.

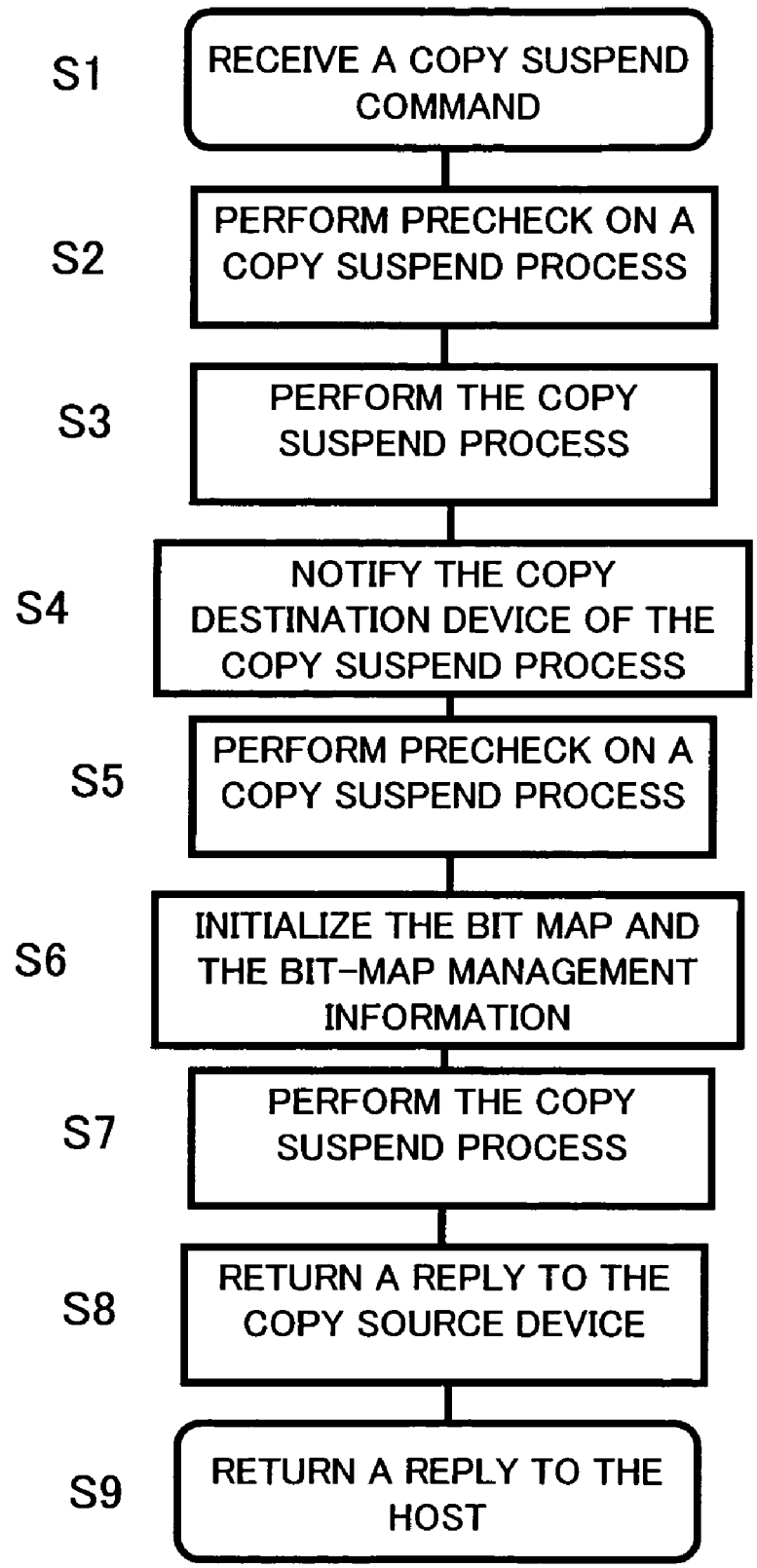

(PRIOR ART)

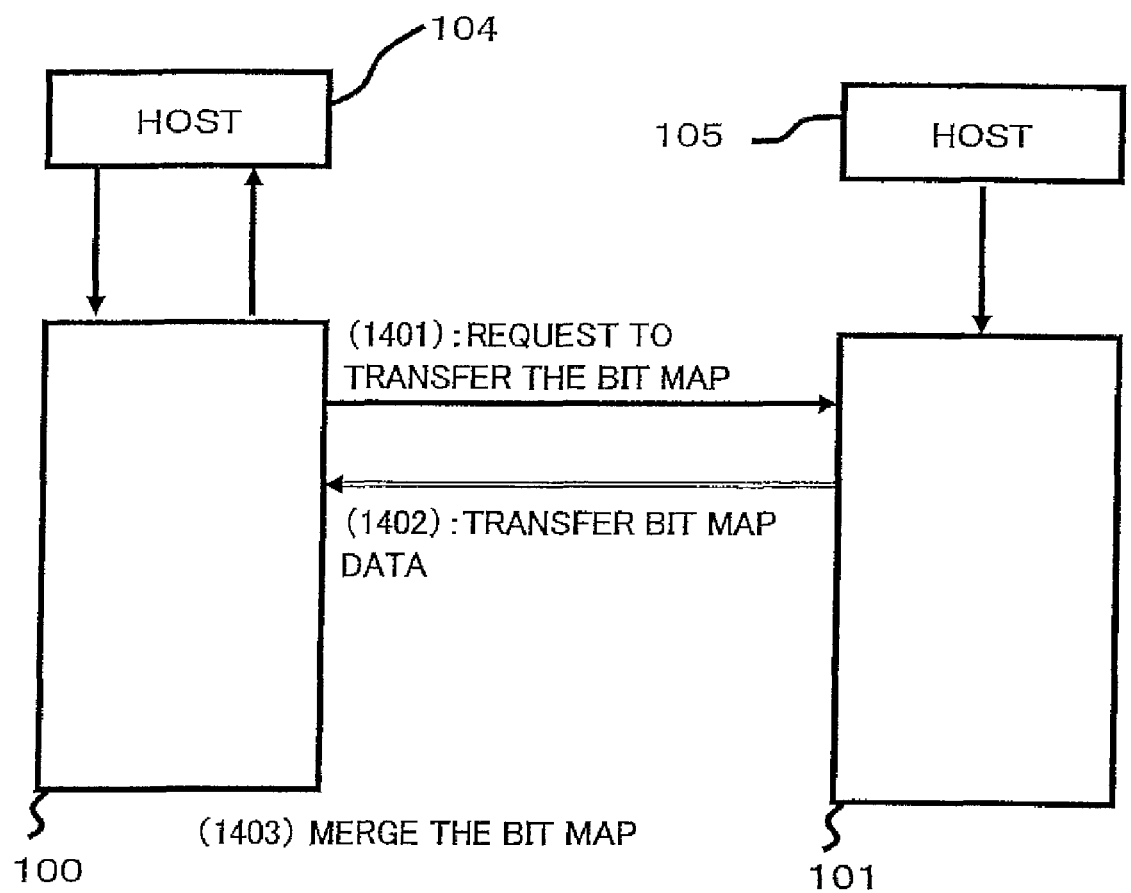

DATA MIRRORING METHOD

BACKGROUND OF THE INVENTION

1. Field of the Invention

The present invention relates to a method of mirroring of data in a copy destination device and a copy source device.

2. Description of the Related Art

With reference to FIGS. 13, 14, copy destination device in a dual-storage apparatus stores user data on storage area. The storage area is partitioned into a plurality of blocks $M_0$, $M_1$, $M_2$, ..., identical to each other in memory size (such as M bits). When a user performs a write process on a copy destination device 101 during a copy suspend mode, bit-map data stored in the copy destination device 101 must be transmitted to a copy source device 100 to assure consistency. The bit-map data 3a in the copy destination device 101 indicates that the transfer of user data to the copy source device 100 is necessary to assure consistency of the data.

As shown in FIG. 13, the bit map is composed of $m_0$, $m_1$, $m_2$, ... respectively, mapped to the blocks $M_0$, $M_1$, $M_2$, .... The bits $m_0$, $m_1$, $m_2$, ... in the bit map respectively correspond to M bits as the size of each block. For example, if the block $M_1$ is rewritten in the copy destination device 101, "1" is written on the bit $m_1$ corresponding to the block $M_1$ to indicate that the bit $m_1$ is rewritten in the copy destination device 101 but not yet transferred to the copy source device 100.

Thereafter, The copy destination device 101 transfers the bit map to the copy source device 100 during a copy resume mode. The copy source device 100, based upon the received bit map from the copy destination device 101, acquites from a the copy destination device 101 the position of the updated user data in the copy destination device 101 that need to be transferred as a data block to the copy source device 100, the storage size M, and the block $M_1$ with a front-end address A thereof rewritten in the copy destination device 101. Matching between the copy source device 100 and the copy destination device 101 is thus achieved.

The copy source device 100 has also the same user data storage area and the same bit-map structure as those of the copy destination device 100.

In a known resume function for remote copying shown in FIG. 14, the copy source device 100 acquires a bit map managing copy data from a remote device, such as a copy destination device 101 after the copy source device 100 acquires receives a copy resume command from a host 104. The copy source device 100 returns A reply to the copy resume command to the host 104 after the copy source device 100 merges the bit map of copy destination device 101 with a bit map of the copy source device 100.

As shown in FIG. 14, the following process steps (1401), (1402), and (1403) are performed after receiving the copy resume command issued from the host 104.

(1401) The host 104 issues to the copy source device 100 the copy resume command indicating copy restarting. The copy source device 100 requests the copy destination device 101 to transfer the bit map of the copy destination device 101.

(1402) In response, the copy destination device 101 transfers bit map data.

(1403) The copy source device 100 merges the bit map acquired from the copy destination device 101 with all bit maps stored in the copy source device 100, and then returns a reply command to the host 104; the copy source device 100 receives the bit map of the copy destination device 101 from the copy destination device 100 and updates the bit maps stored in the copy source device 100.

If the size of a copy session is large (if the number of bit maps is large), the amount of bit-map information transmitted from the copy destination device 101 as a partner increases, and time required for a merge process increases. For example, even if the merge process is completed within time-out of copying by a host command, unupdated bit-map data can be transferred and merged. If the amount of updated user data on the copy destination device is small, unnecessary bit map data transfer is performed at operation (2) in FIG. 14.

In a storage apparatus, a first volume and a second volume are paired with each other for data backup. After the two volumes are shifted from a dual mode to a separate mode, the storage apparatus manages a storage area in which data is written on the first volume. A memory unit is set up in the storage device as a management unit for managing the storage area on which data writing is performed. The memory unit corresponds to a storage area on the first volume equal to a maximum transfer length transferable at one time in the data copying from the first volume to the second volume. The management unit corresponding to the storage area on which data writing has been performed is identified. A flag indicating that data writing has been performed on the identified management unit is set. This data backup method is proposed in Japanese Unexamined Patent Application Publication No. 2003-173240.

In accordance with the Japanese Unexamined Patent Application Publication No. 2003-173240, the second volume compares the bit map from the first volume byte by byte and if a difference exists the bit map information is copied to update the bit map itself on second volume. Even if the bit map of the first volume is unupdated with all zeroes, the bit map needs to be merged with the bit map volume. The needless process is thus performed.

SUMMARY OF THE INVENTION

The embodiments of the present invention overcome the above-mentioned problem as well as others, that may become apparent from the description of the embodiments.

In accordance with one embodiment of the present invention, an apparatus includes a first storage device and a second device to store user data. The first storage device includes a controller to control the first storage device according to a process including maintaining bit-map information indicative of locations of updated portions of the user data, maintaining rounded bit-map information indicative of portions of said bit-map information indicating the location of said updated portions. The second storage device includes a controller to control the second storage device according to a process including maintaining a copy bit-map information indicative of locations of the user data to be copied, copying the user data based upon the copy bit-map information, receiving the rounded bit-map information maintained in the first storage device, upon receiving a copy resume command to resume the copying, acquiring a portion of said bit-map information maintained in the first storage device, based upon the rounded bit map information; and updating the copy of the user data by accessing a location of the user data in the first storage device as indicated by the portion of the acquired bit-map information for synchronization of the copy of the user data with the user data.

The present invention thus provides the following advantages.

The copy destination device stores the bit-map management information which is formed by rounding bit map information according to a predetermined unit. After the bit-map management information is acquired from the copy destination device by the copy source device and is then stored in a predetermined location, a command end reply is returned by the copy source device during a copy resume mode in which the copy source device updates the data, based upon the bit map management information from the copy destination device. Even in a large copy size session, the amount of process of the copy operation is reduced during the copy resume mode in which the copy source device updates the data, based upon the bit map management information from the copy destination device because the bit-map management information is smaller than the bit map information. The host has a predetermined time, and measures a copy resume command time from transmitting the copy resume command to receiving a command end reply. The host compares the predetermined time to the copy resume command time. If the host determines that the predetermined time is smaller than the copy resume command time, the host determines that time out of the copy resume command happens. The time out of the copy resume command is thus controlled because the copy source device is able to finish the copy resume mode within the time out. Since the copy source device performs the merge process based on the bit-map management information acquired from the copy destination device, the copy source device acquires only the bit map updated in the copy destination device from the copy destination device. Unnecessary acquisition of data is thus avoided.

The copy resume command is performed using the bit-map management information method of the present invention. If the range of copying becomes small with the number of bit maps being small, the speed of process can become slow. Instead of always performing the present embodiment method, the known method and the present embodiment method are selectively used depending on the number of bit maps in the copy session and the amount of data to be updated in the copy destination device.

BRIEF DESCRIPTION OF THE DRAWINGS

FIG. 7 illustrates a process flow during a copy/backup suspend mode according to an embodiment of the present invention;

FIG. 14 illustrates a second known example.

DESCRIPTION OF THE PREFERRED EMBODIMENTS

In accordance with one embodiment of the present invention, a bit-map processing method of a data storage apparatus including a copy source device storing data of a user and a copy destination device storing the same data as one stored on the copy source device, includes receiving bit-map management information from the copy destination device during a copy resume mode in which the copy source device updates the data, based upon the bit map management information from the copy destination device, acquiring a required bit map from the copy destination device based on the bit-map management information acquired from the copy destination device and merging the bit map to a corresponding bit map of the copy source device, clearing the bit map in the copy destination device during a suspend mode, updating the bit-map management information for managing the bit map to bit information indicating that a write operation has been performed, when the write operation has been performed in the copy destination device during the suspend mode, and transmitting the bit-map information from the copy source device when an update operation has been performed in the copy source device during the resume mode. The copy source device requests the copy destination device to transfer the bit-map management information during the resume mode, and the copy source device transmits to copy destination device in the bit-map management information transmitting, the bit-map management information updated in the bit-map management information updating so that the copy destination device stores the same data as the data stored on the copy source device.

A. Introduction of the Invention

Figure 1:
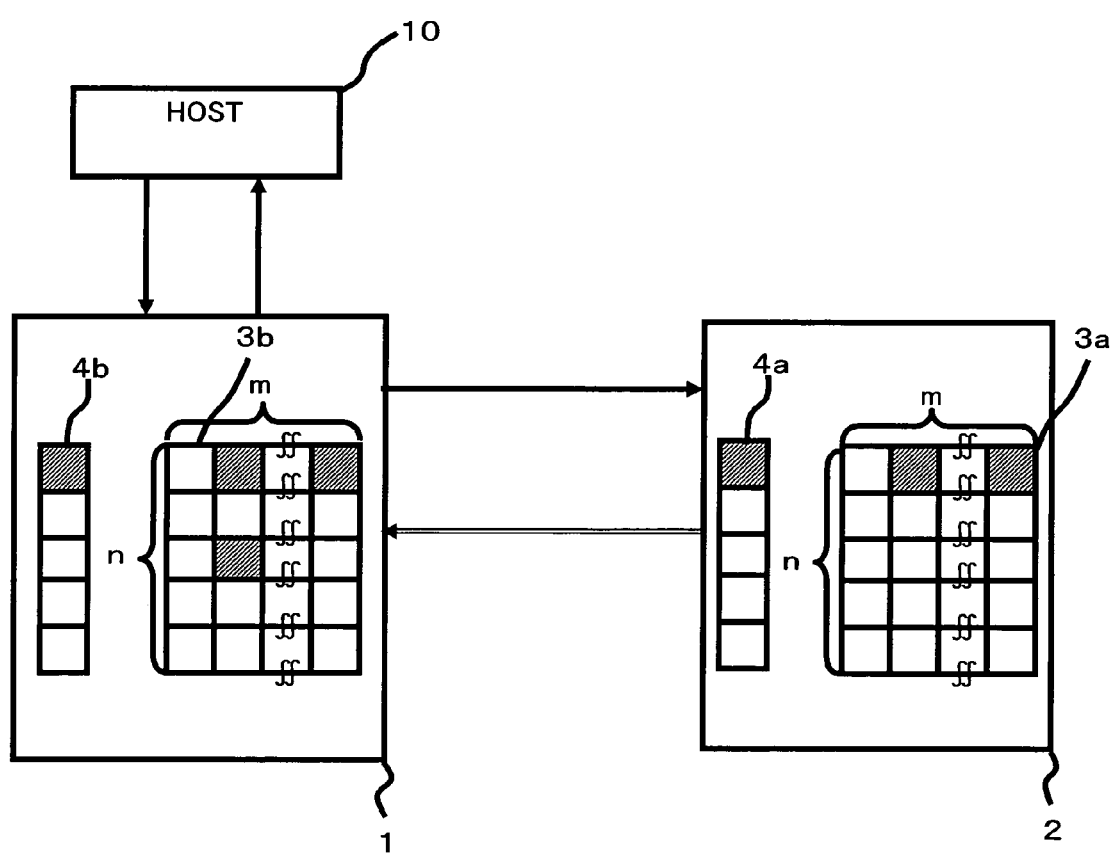
FIG. 1 is a block diagram indicating a sequence of acquiring a bit-map management information of one embodiment of the present invention.

The present invention is described below with reference to FIG. 1. FIG. 1 illustrates a copy source device 1, a copy destination device 2, a bit map 3a, 3b, bit-map management information 4a,4b, and a host 10. If a write operation is performed on a user data storage area (not shown) of the copy destination device 2 during a copy suspend mode in which the copy source device 1 does not communicate with the copy destination device 2 and even if the copy destination device 2 updates the user data in the copy destination device 2, the copy source device 1 does not update the user data stored in the copy source device 1, bit map information 3a (for example, hatched area "1" in a bit map 3 of FIG. 1) is written on a bit map 3a corresponding to a block on which the write operation has been performed. The bit map information 3a indicates the written user data is untransferred and still in need of being transferred to the copy source device 1. FIG. 1 illustrates two units of untransferred bit-map information.

In accordance with one embodiment of the present invention, the bit-map management information 4a corresponding to the bit-map information 3a is provided by copy source device 1 to indicate the presence of the bit map area to be transferred to copy source device 1. As shown in FIG. 1, bit-map management information 4a of 1×n size is prepared. The bit-map management information 4a indicating the presence of the bit map area 3a to be transferred to the copy source device 1 is written on a per row basis. As shown in FIG. 1, information indicating the presence of the updated user data is written at two locations in the first row of the bit map 3a. The presence of the user data to be transferred is indicated by writing "1", for example, on the first segment of the bit-map management information 4a corresponding to the bit map 3a row. The bit-map management information 4a has one column and a number of row corresponding to the bit map 3a. The user data to be transferred is thus known to exist at the first row of the bit map 3a.

As shown in FIG. 1, even if the number of units of bit map data 3a to be transferred to the copy source device 1 is two, the presence of the data to be transferred is shown by a number of bits smaller than the number of units of bit map data indicated in the bit map 3a, for example, by 1 bit per bit map 3a rows. The process of showing the smaller number of bits is referred to a "round" operation in this specification. For example, the round process is performed by writing "1" onto the corresponding segment of the bit-map management information 4a and being updated during updating of the bit map 3a.

As shown in FIG. 1, the copy destination device 2 stores the bit-map management information 4a, namely, information to which the bit-map information is rounded according to a predetermined unit. During the resume mode in which copy of user data is resumed between the copy source device 1 and the copy destination device 2, the copy source device 1 acquires the bit-map management information 4a from the copy destination device 2, and stores the acquired bit-map management information 4a as a bit-map management information 4b at a predetermined location. A command end replay is then returned to the host 10. An actual bit-map merge process, as a process separate from the resume process, is performed based on the bit-map management information 4b acquired from the copy destination device 2.

Even in a large copy size session, the amount of process of the copy operation is reduced during the resume mode. The occurrence of a host time out of the copying and a subsequent copy resume command is thus controlled. Since the merge process is performed based on the bit-map management information 4b acquired from the copy destination device 2, only the bit map updated in the copy destination device 2 is acquired by the copy device 1. Unnecessary acquisition of data is avoided by the copy source device 1.

When the host 10 outputs a copy resume command to the copy source device 1 in FIG. 1, the following process steps 1-3 are performed.

1. The copy source device 1 issues a copy resume command to resume the copying of user data to the copy destination device 2, thereby requesting the copy destination device 2 to transfer the bit-map management information 4 which is a rounded form of the bit map 3.

2. In response, the copy destination device 2 transfers the bit-map management information 4a which is the rounded form of the bit map 3a.

3. The copy source device 1 stores the rounded bit-map management information 4a, which is transferred from the copy destination device 2, as a bit-map management information 4b.

The process steps 1-3 are repeated if the amount of bit-map management information is large. Even if the process steps 1-3 are repeated, the speed of the embodiment process is faster than the known method, because the bit map management information 4a is smaller than bit map information 3a. For example, the actual bit map merge process in which the copy source device 1 merges the bit map 3b in the copy source device 1 can be performed separately from the resume process. The bit map 3b corresponds to the bit map 3a in the copy destination device 2.

The copy resume command is performed using the bit-map management information method of the present invention. If the range of copying becomes small with the number of bit maps being small, the speed of process becomes slow because the processing time or processing resources to generate the bit map information 4a can be larger than the generation of the bit-map management information 3a. Instead of always performing the above-mentioned method, the known method and the above-mentioned method are selectively used depending on the number of bit maps 3a in the copy session and the amount of data to be updated in the copy destination device 2. The bit-map management information 4b corresponds to the bit-map management information 4a acquired from the copy destination device 2. The copy source device 1 acquires a bit map 3a corresponding to the bit-map management information 4b as necessary from the copy destination device 2. The copy source device 1 merges the bit map 3a row to a corresponding bit map 3b row of the copy source device 1.

B. Structure of the Invention

Figure 2:
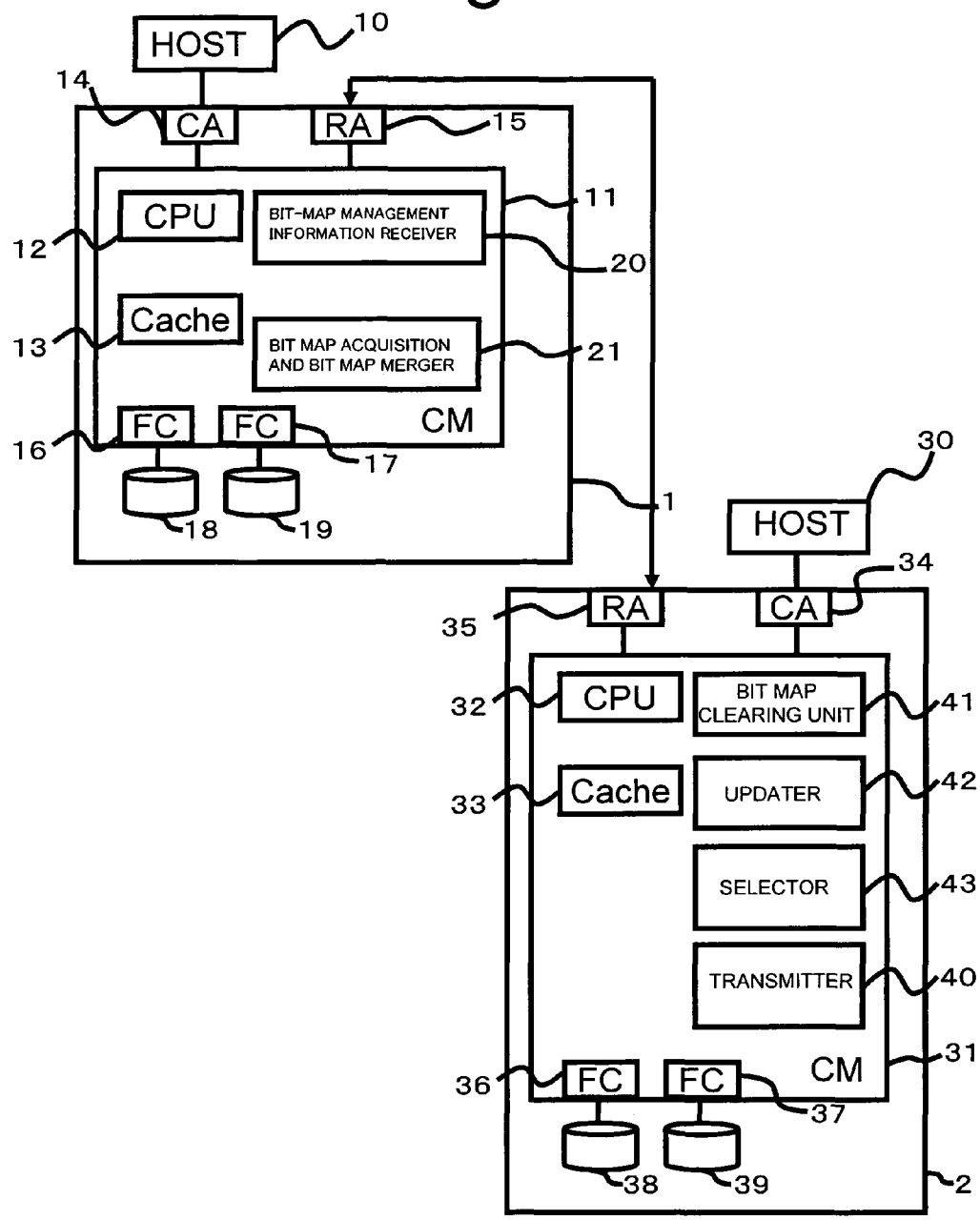
FIG. 2 is a functional block diagram of one embodiment of the present invention.

The structure of the present invention is described below with reference to FIG. 2. FIG. 2 illustrates a copy source device 1, a copy destination device 2, a host 10, a controller 11, a CPU 12, a cache 13, a channel adaptor 14 for controlling interface with the host 10, a remote adaptor 15 for controlling interface with the copy destination device 2, disk interface controllers 16 and 17, user disks 18 and 19, bit-map management information receiver 20, and bit map acquisition and bit map merger 21.

FIG. 2 also illustrates a host 30, a controller 31, a CPU 32, a cache 33, interface controllers 34 and 35, disk interface controllers 36 and 37, user disks 38 and 39, bit-map management information transmitter 40, bit map clearing unit 41, bit-map management information updater 42, and conventional/inventive method selector 43.

According to an aspect of the embodiment, the copy destination device 2 is a storage device of user data. The copy source device 1 is a storage device located remotely from the copy destination device 2 and copies the user data thereon.

In FIG. 2, the host 10 is operated by an operator in the copy source device 1. The controller 11 manages resources such as a cache memory 13, the channel adaptor 14, and controls copying operation.

The CPU 12 controls the controller 11. The remote adaptor 15 controls interface with the remote copy destination device 2.

The interface controllers 16 and 17 store mirrored user data in user disks 18 and 19. If updating of the bit-map management information 3a is performed in the copy destination device 2 during the copy resume mode, the bit-map management information receiver 20 receives the bit-map management information 4a rather than the bit map 3a from the copy destination device 2.

According to the bit-map management information 4b corresponding to the bit-map management information 4a acquired from the copy destination device 2, the bit map acquisition and bit map merger 21 acquires a bit map 3a corresponding to the bit-map management information 4b as necessary from the copy destination device 2, and merges the bit map 3a row to a corresponding bit map 3b row of the copy source device 1. The bit-map management information 4a,ab has one column and a number of rows corresponding to the bit map 3a,3b. Some rows of the bit-map management information 4a are written "1". The bit map 3a corresponding to the bit map management information 4b rows written "1" is acquired by the bit map acquisition and bit map merger 21 from the copy destination device 2.

In FIG. 2, the host 30 is operated by a user on the copy destination device 2. The controller 31 controls resources such the cache 33, and the channel adaptor 34, and controls copying to copy source device 1.

The CPU 32 controls the controller 31. The remote adaptor 35 controls interface with the copy source device 1.

The interface controllers (fiber channels) 36, 37 store mirrored user data in user disks 38, 39. The user disks 38 and 39 store primary user data. If updating of the bit map 3a is performed in the copy destination device 2 during the copy resume mode, the bit-map management information transmitter 40 transmits from the copy destination device 2 the bit-map management information rather than the bit map 3a.

The bit map clearing unit 41 clears the bit map 3a during the copy suspend mode.

When a write operation is performed on the copy destination device 2 during the copy suspend mode, the bit-map management information updater 42 writes data, for example, "1" indicating that an update has been performed on the bit-map management information 4a managing the bit map 3a corresponding to a storage area where the write process has been performed during the copy suspend mode. When the data such as, "1" indicating that the update has been performed is written on the corresponding area of the bit map 3a, data indicating that the updating has been performed is also written on the bit-map management information 4a. The rounding operation is thus performed.

The rounding operation is to compress the bit map 3a so as to reduce the size of bit map 3a. The bit-map management information 4a is formed by the compressing bit map 3a. The bit-map management information 4a has "1" column and "n" rows corresponding to the bit map 3a. The bit map 3a has "m" column and "n" rows. Each row of the bit-map management information 4a corresponds to the row of the bit map 3a. The user data to be transferred to the copy source device 1 is known by writing "1" at the segments of the bit map 3a. The rows of the bit-map management information 4a are written "1" which indicates the presence of the written "1" at the rows of the bit map 3a. As a consequence, the data to be transferred to the copy source device 1 is compressed, because the copy destination device 2 transfers the bit-map management information 4a instead of the bit map 3a to the copy source device 1.

The conventional/inventive method selector 43 selects whether to perform in the resume mode, the known method, namely, the bit map transmission method of transmitting the bit map 3a to the copy source device 1 or the inventive method, namely, the method of transmitting the bit-map management information 4a to the copy source device 1. The copy source device 1 stores the bit-map management information 4a as the bit-map management information 4b. If the known method is selected, a known method bit map transmitter means (not shown) is controlled.

In the above discussion, the bit-map management information receiver 20 and the bit map acquisition and bit map merger 21 in the copy source device 1 are implemented by the CPU 12 under the control of a computer program, or by firmware that controls hardware using a dedicated program.

The bit-map management information transmitter 40, the bit map clearing unit 41, the bit-map management information updater 42, and the conventional/inventive method selector 43 in the copy destination device 2 are implemented by the CPU 13 under the control of a computer program, or by firmware that controls hardware using a dedicated program.

C. Process Content of the Invention

The basic process of one embodiment of the present invention is mainly divided into three tasks a) through c) as described below.

a) Creation of a bit map in the copy destination device and a bit-map management information corresponding to the bit map b) Acquisition of the bit-map management information of the task a) from the copy destination device during the copy resume mode c) Merge process of the bit map by the copy source device a) Creation of a Bit Map in the Copy Destination Device 2 and a Bit-map Management Information Corresponding to the Bit Map is Described Next.

To perform a copy resume function, a copy session must have been first set to a copy suspend function for resetting the bit map and the bit-map management information indicating a previous copying process. To store a location of user data update performed on the copy destination device 2 during the copy suspend mode, the bit map information and the bit-map management information can be cleared (initialized) on the copy destination device during the copy suspend mode, so that the bitmap, including bitmap management information, updater 42 can indicate or identify data writing locations (addresses) in the copy destination device 2 during the copy suspend mode by writing "1" in the bitmap and the bit map management information for the next copying or copy resume process.

When the user data or some parts of the user data are modified on the copy destination device 2, the bit map 3a is updated by the copy destination device 2. The bit map information which is updated by the copy destination device 2 corresponds to the user data or some parts of the user data which are modified on the copy destination device 2. The bit-map management information 4a is also updated by the copy destination device 2. The bit-map management information 4b which is updated by the copy source device 1 corresponds to the bit map 3a which is updated by the copy destination device 2.

Figure 3:
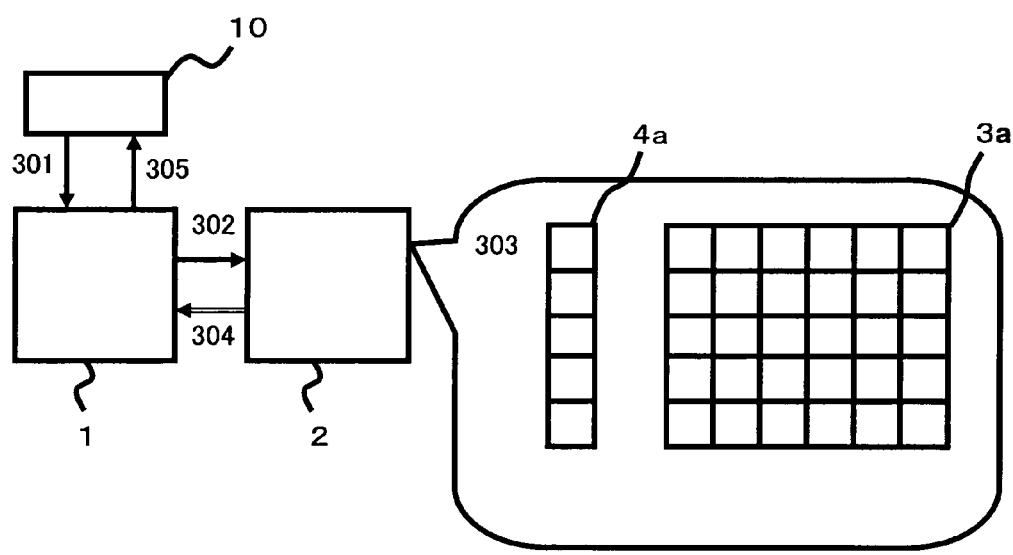
FIG. 3 illustrates a bit map and a management status of management information thereof, in accordance with one embodiment of the present invention.

The management of the bit map and the bit-map management information 4a,4b are discussed with reference to FIG. 3.

(301) The copy source device 1 receives a copy suspend command issued from the host 10, thereby starting a copy suspend process.

(302) The copy source device 1 requests the copy destination device 2 to perform a copy suspend process after performing the copy suspend command on the copy source device 1.

(303) As part of the copy suspend process, the copy destination device 2 clears the bit map 3a managing a copy status of a copy session to be handled, and the bit-map management information 4a of the bit map 3a, so that the bitmap, including bitmap management information, updater 42 can indicate or identify data writing locations (addresses) in the copy destination device 2 during the copy suspend mode by writing "1" in the bitmap and the bit map management information for the next copying or copy resume process. Referring to FIG. 3, for example, the blank bit map 3a and the blank bit-map management information 4a indicate cleared states thereof.

(304) The copy destination device 2 returns a reply responsive to the process request to the copy source device 1.

(305) The copy source device 1 returns a reply responsive to the copy suspend command to the host 10.

Figure 4:
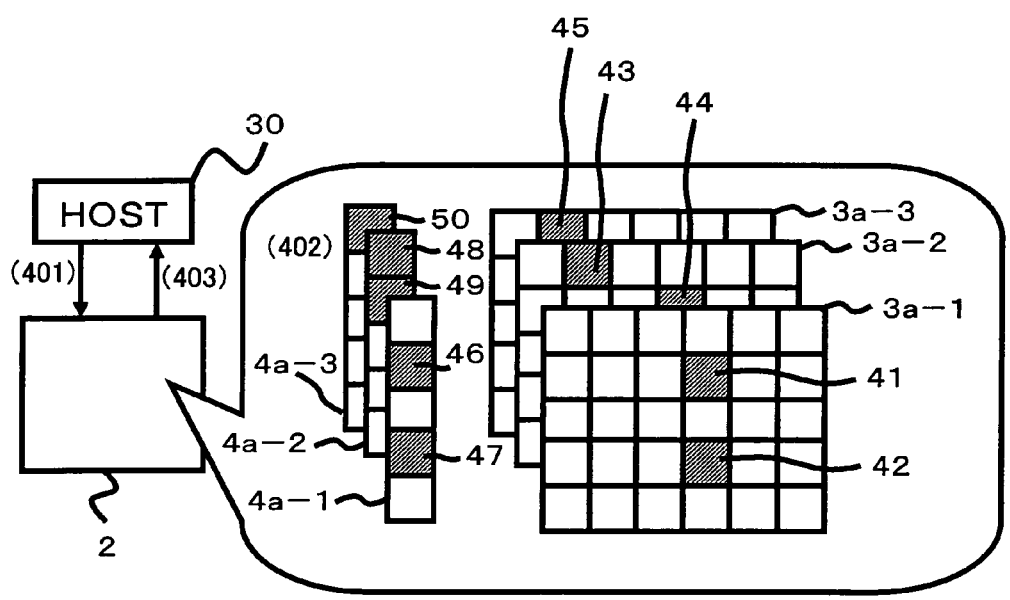
FIG. 4 illustrates the management of a location where data is written according to an embodiment of the present invention.

The location of written data is managed by the bit map acquisition and bit map merger 21 as shown in FIG. 4. After the copy process is suspended in response to the suspend command, another host 30 may write data onto a data area (not shown) in the copy source device 1 or the copy destination device 2. In such a case, for example, the copy destination device 2 writes data at locations of bit maps 3a-1, 3a-2, 3a-3, . . . , and management information 4a-1, 4a-2, 4a-3, . . . thereof.

As shown in FIG. 4, each of the bit maps 3a-1, 3a-2, and 3a-3 has a size of five rows by six columns, and indicate the presence of untransferred data at the corresponding data area. As shown in FIG. 4, the presence of untransferred data is indicated by single hatched areas of the bit maps 3a-1 through 3a-3 (in the state where "1" is written, for example).

As shown in FIG. 4, "1" is written on area 41 at the second row and the fourth column and area 42 at the fourth row and the fourth column in the bit map 3a-1. "1" is also written on area 43 at the first row and the second column and area 44 at the second row and the fourth column in the bit map 3a-2. Furthermore, "1" is also written on area 45 at the first row and the second column in the bit map 3a-3. In accordance with the rows of the bit maps 3a-1, 3a-2, . . . , "1" indicating the presence of untransferred data is written onto the bit-map management information 4a-1, 4a-2, and 4a-3, respectively. "1" is written on area 46 at the second row and area 47 at the fourth row in the bit-map management information 4a-1. "1" is also written on area 48 at the first row and area 49 at the second row in the bit-map management information 4a-2. "1" is also written on area 50 at the first row in the bit-map management information 4a-3.

The bit-map management information 4a-1 of FIG. 4 shows that the untransferred data is present at the second row and the fourth row of the bit map 3a-1. The bit-map management information 4a-2 of FIG. 4 shows the untransferred data is present at the first row and the second row of the bit map 3a-2, and the bit-map management information 4a-3 shows that the untransferred data is present at the first row of the bit map 3a-3. The area 46 in the bit-map management information 4a-1 corresponds to the second rows in the bit map 3a-1, and "1" written on the area 46 in the bit-map management information 4a-1 indicates the presence of the "1" on area 41 in the bit map 3a-1; The area 47 in the bit-map management information 4a-1 corresponds to the fourth row in the bit map 3a-1, and "1" written on the area 47 in the bit-map management information 4a-1 indicates the presence of the "1" on area 42 in the bit map 3a-1. The area 48 in the bit-map management information 4a-2 corresponds to the first row in the bit map 3a-2, and "1" written on the area 48 in the bit-map management information 4a-2 indicates the presence of the "1" on area 43 in the bit map 3a-2. The area 49 in the bit-map management information 4a-2 corresponds to the second row in the bit map 3a-2, and "1" written on the area 49 in the bit-map management information 4a-2 indicates the presence of the "1" on area 44 in the bit map 3a-2. The area 50 in the bit-map management information 4a-3 corresponds to the first row in the bit map 3a-3, and "1" written on the area 45 in the bit-map management information 4a-3 indicates the presence of the "1" on area 45 in the bit map 3a-3. This discussion is further continued with reference to FIG. 4.

(401) The host 30 connected to the copy destination device 2 issues a write request to the copy destination device 2 to write data.

(402) The copy destination device 2 processes the write request. If the write request covers an area of copy, the copy destination device 2 performs a process to record an indication that a write operation is performed on the bit map 3a managing the area and the bit-map management information 4a of the bit map 3a. For example, if the write operation is performed on the area 41 at the second row and the fourth column and the area 41 the fourth row and the fourth column in the bit map 3a-1 of FIG. 4, "1" is recorded onto the single hatched areas in the bit map 3a-1 and the bit-map management information 4a-1.

(403) The copy destination device 2 returns the reply responsive to the write request to the host 30. The updating of the copy data is thus performed in each device during the copy suspend mode in which the copy destination device 2 does not communicate with the copy source device 1. In the copy suspend mode, the copy source device 1 does not receives the bit map information 4a, and is not able to update the user data stored in the copy source device 1, even if the copy destination device 2 updates the user data in the copy destination device 2. Therefore, the copy source device 1 stores the bit map 3b and the bit-map management information 4b indicating the updating of the copy data in the copy destination device 2 during the copy suspend mode.

b) Acquisition of the Bit-map Management Information of the Task a) From the Copy Destination Device 2 During Copy the Resume Mode A process of acquiring the bit-map management information 4a from the copy destination device 2 during the resume mode is described below with reference to FIG. 5.

Figure 5:
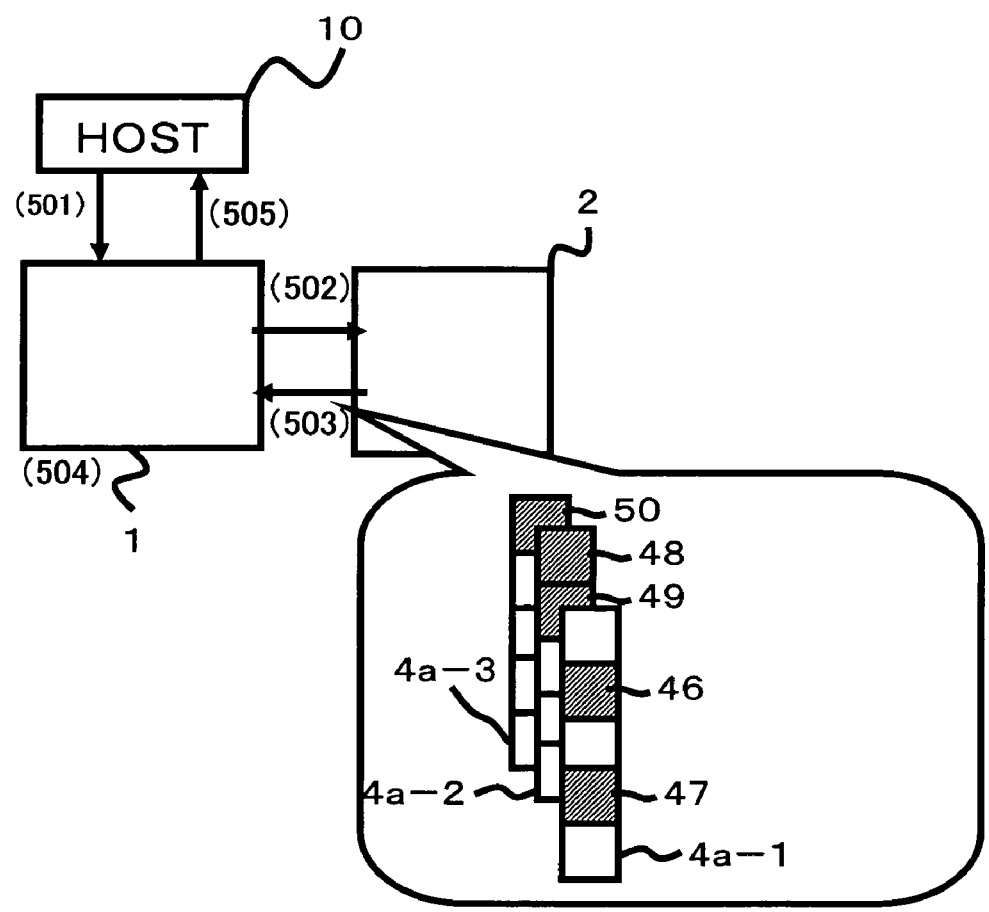
FIG. 5 illustrates how bit-map management information is acquired according to an embodiment of the present invention.

As shown in FIG. 5, at 302 the copy source device 1 requests the copy destination device 2 to acquire the bit-map management information 4a-1, 4a-2, . . . managed in the copy destination device 2 when the copy source device 1 receives a copy resume command from the host 10 (301). In response to this command, at 304 the copy destination device 2 transfers to the copy source device 1 the bit-map management information 4a-1, 4a-2, . . . of the session managed during the copy suspend mode. At 306, the copy source device 1 stores, at predetermined locations, the bit-map management information 4a-1, 4a-2, . . . transmitted from the copy destination device 2, and switches from the suspend progress to the resume-in-progress state. The copy destination device 2 also switches from the suspend progress status to the resume-in-progress. At 305, the copy source device 1 returns a reply responsive to the copy resume command to the host 10. This process is discussed further more in detail with reference to FIG. 5.

(501) The copy source device 1 receives a copy resume command output from the host 10. The copy source device 1 starts a copy resume process.

(502) The copy source device 1 requests the copy destination device 2 to perform the resume process.

(503) The copy destination device 2 then starts the copy resume process, switches from the suspend progress status to the resume-in-progress, and transfers to the copy source device 1 the bit-map management information 4a-1, 4a-2, managed during the copy suspend mode. If there is no updating in the bit-map management information 4a-1, 4a-2, . . . (for example, all zero state), no transfer is performed.

(504) The copy source device 1 stores, at a predetermined location, the bit-map management information 4a-1, 4a-2, . . . received from the copy destination device 2 and performs the resume process (changes status, for example).

(505) The copy source device 1 returns a reply responsive to the copy resume command to the host 10.

c) Merge Process of the Bit Map

Figure 6A:
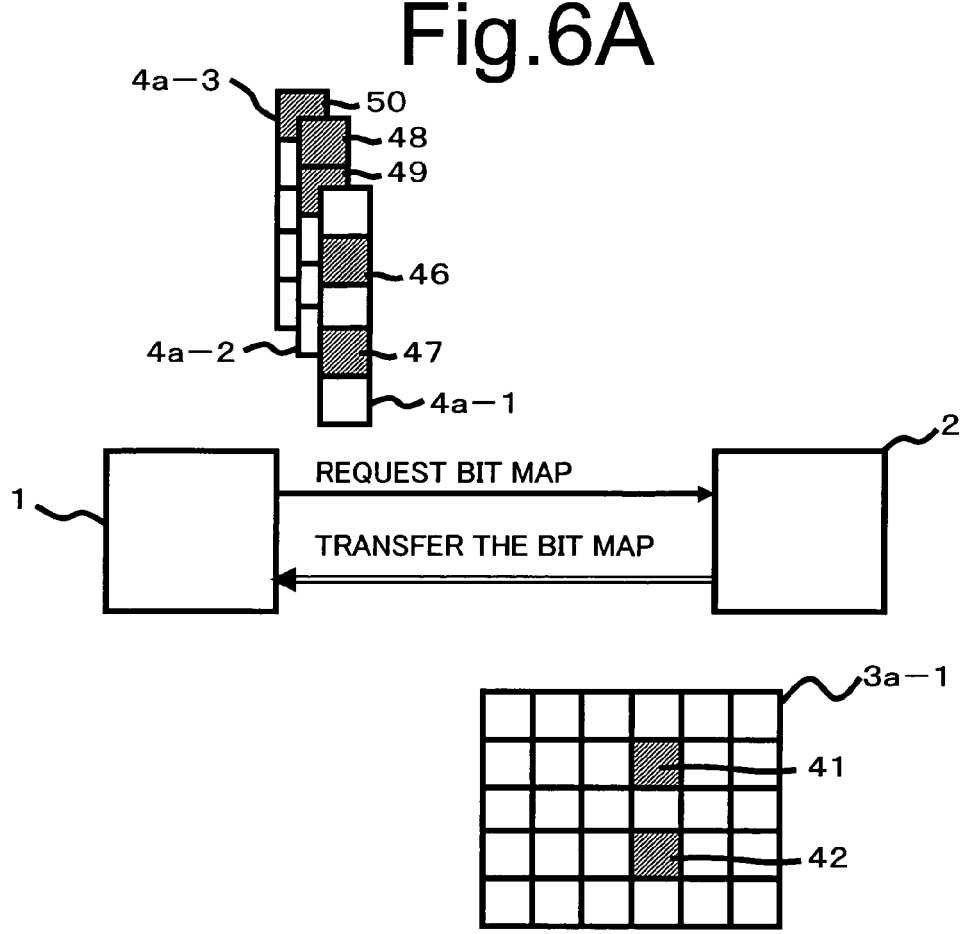
FIGS. 6A and 6B illustrate a merge status responsive to the bit-map management information according to an embodiment of the present invention.
Figure 6B:
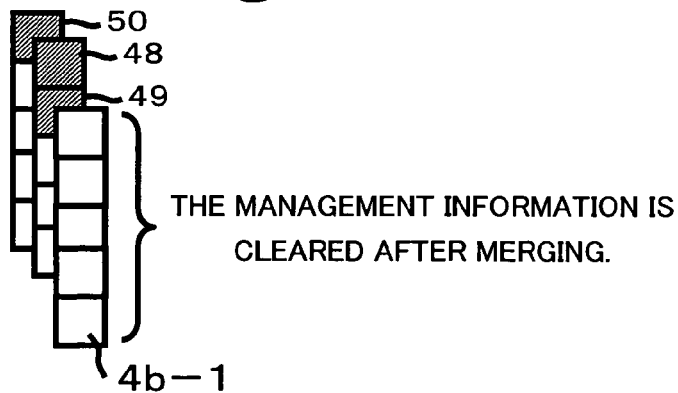

Simply performing the copy resume process means the acquisition of only the bit-map management information 4a corresponding to the bit-map 3a from the copy destination device 2. In a separate process, an actual bit map 3a row needs to be acquired from the copy destination device 2 for updating the user data of the copy source device 1. At the completion of the copy resume process, a task for a bit map merge process of the corresponding copy session is initiated by the bit map acquisition and bit map merger 21 of the copy source device 1. As shown in FIG. 6A, in the copy source device 1 the task finds a location having undergone updating at from the copy destination device 2 based on the bit-map management information 4*a*-1, 4*a*-2, . . . of the copy destination device 2 acquired during the session of the resume process, acquires only the bit map 3*a* information corresponding to the acquired bit map management information 4*a*, and merges the bit map 3*a* to the bit map 3*b* of the copy source device 1 to update the same parts of the bit map 3*b* corresponding to the parts of the bit map 3*a* which are written "1". As shown in FIG. 6B, the bit-map management information 4*b*-1 indicating the bit map 3*b*-1 is cleared after merging in the copy source device 1.

D. Detail of Control

In one embodiment of the present invention, management is performed using the following tables and statuses.

a) Bit-map management information that manages the bit map by rounding (table)

b) Phase of session indicating that the merge process is in progress (representing the copy resume process by session unit)

c) Flag indicating that the merge process of the bit map is in progress (table by bit map unit)

(1) Process Flow During the Suspend Mode

The process flow during the suspend mode is described below with reference to FIG. 7 in view of FIG. 3.

The copy source device 1 receive a suspend command from the host 10 (step S1). The copy source device 1 performs precheck on a suspend process (step S2). The copy source device 1 determines whether all data of the copy source device 1 has been copied to the copy destination device 2 and checks to see if the suspend process is possible. The precheck on a suspend process (step S2) is due to confirm a previous copying process has been finished by the copy source device 1.

The copy source device 1 performs the copy suspend process (step S3). The copy source device 1 notifies the copy destination device 2 of the suspend process (step S4). The copy destination device 2 performs precheck to see if the suspend process is possible in the same manner as in step S2 performed by the copy source device 1 (step S5).

The copy destination device 2 initializes the bit map 3 and the bit-map management information 4 of the bit map 3, namely, set the bit map 3 and the bit-map management information 4 to all zeroes (step S6). The copy destination device 2 performs the copy suspend process (step S7).

The copy destination device 2 returns a reply to the copy source device 1 in response to step S4 (step S8). The copy source device 1 returns a reply to the host 10 in response to step S1 (step S9).

Figure 8:
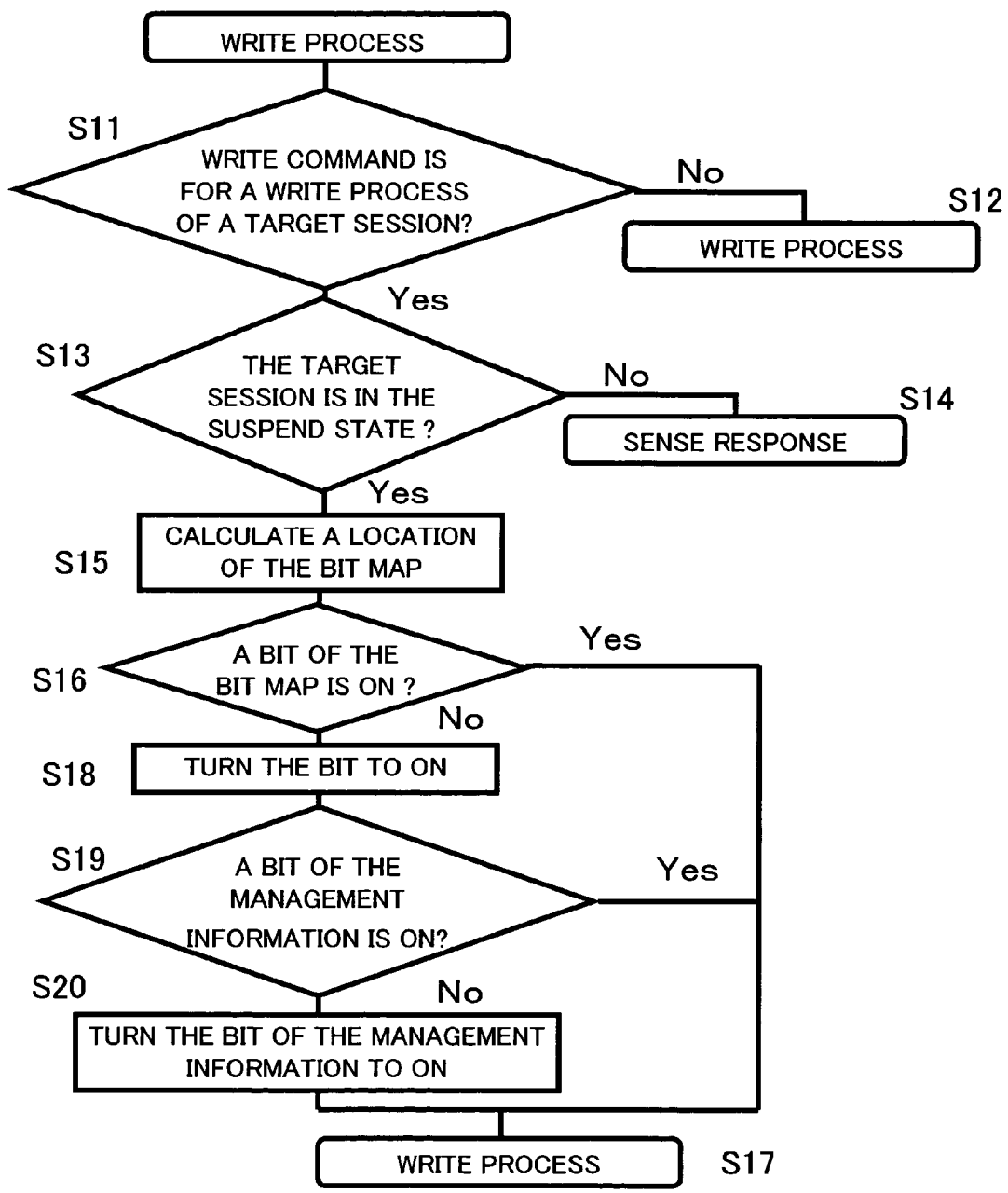
FIG. 8 illustrates a write operation on a copy destination device during the suspend mode according to an embodiment of the present invention.

(2) Write Process on the Copy Destination Device 2 During the Copy Suspend Mode A write process on the copy destination device 2 during the copy suspend mode is described below with reference to FIG. 8 in view of FIG. 4.

The host 30 issues a write command to the copy destination device 2 (step S11). The copy destination device 2 determines whether the write command is for a write process in a user data storage location subject of a target copy session in the copy destination device 2.

If the write command is not for the write process of the target copy session, the write process is performed because the write command is not related to copying (step S12). In this case, the write command is not related to the copying, and no data writing is performed on the bit map.

If the controller 11 determines that the write command is for the write process of the intended copy session by referring to the location of the write process in the write command, the controller 11 of the copy destination device 2 determines whether the target copy session is in the copy suspend state (step S13).

If the controller determines that the target session is not in the copy suspend state, writing to the target session of the copy destination device 2 is impossible. A sense response that writing to the copy destination device 2 is disabled, i.e., an error response is returned to the host 30 (step S14).

If the controller 11 determines that the session is in the copy suspend state, a management size of the bit map 3*a* is identified in the copy destination device 2. The copy destination device 2 calculates the location of the bit map 3*a* row corresponding to the write location based on the size of a write destination address (step S15).

The copy destination device 2 determines whether the bit of the bit map 3*a* is on for identifying the write process to be performed at the location of the bit map 3*a* row (step S16).

If it is determined that the bit of the bit map 3*a* is on, the copy destination device 2 performs the write process responsive to the write command output from the host 30 in step S8 (step S17).

If it is determined in step S6 that the bit of the bit map is not on, the copy destination device 2 turns the bit to on (step S18).

The copy destination device 2 determines whether the corresponding bit of the management information 4*a* is on (step S19). If it is determined that the bit of the management information 4*b* is on, the copy destination device 2 performs the same process as in step S17.

If it is determined that the bit of the management information 4*a* is not on, the bit of the management information 4*a* is turned to on (step S20). The same write process as in step S7 is then performed.

(3) Process Flow of the Copy Resume Command

Figure 9:
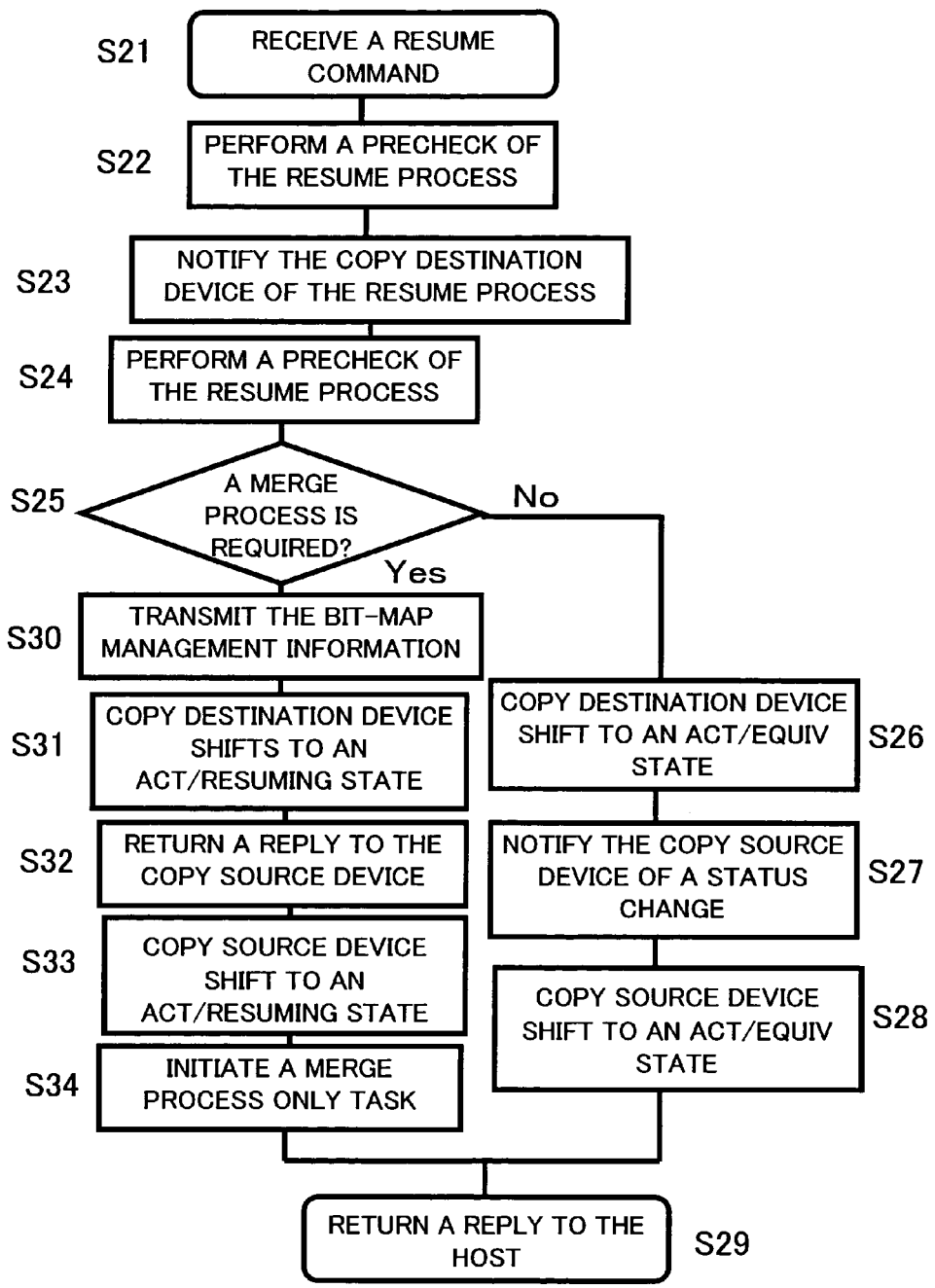
FIG. 9 illustrates a process flow of a copy resume command according to an embodiment of the present invention.

The process flow of the copy resume command of one embodiment of the present invention is described below with reference to FIG. 9 in view of FIG. 5.

The copy source device 1 receives a copy resume command from the host 10 (step S21). The copy source device 1 performs the precheck of the copy resume process to see if a copy session of interest is in the copy suspend state (step S22). The copy source device 1 check the state by referring to the flag indicative of the suspend state. If the flag corresponding to the suspend state is on, the controller 11 of the copy source device 1 determines that the state is the suspend state.

The copy source device 1 notifies the copy destination device 2 of the copy resume process (step S23). The copy destination device 2 performs the precheck of the copy resume process in the same manner as in step S22 performed by the copy source device 1 (step S24).

The copy destination device 2 determines whether data has been rewritten on the copy destination device 2 and determines whether a merge process is required depending on the presence of data to be transferred to the copy source device 1 (step S25).

If no data has been rewritten, no merge process is required. The copy destination device 2 is shifted to an act/equiv state indicating that the copy destination device 2 is equivalent to the copy source device 1 and currently copying (step S26).

The copy destination device 2 then notifies the copy source device 1 of a status change (step S27). In response, the copy source device 1 is shifted to an act/eqiv state (step S28). The copy source device 1 returns a reply to the host 10 (step S29).

If it is determined in step S5 that the copy destination device 2 needs a merge process, the copy destination device 2 transmits the bit-map management information 4a-1, 4a-2, . . . (step S30) to the copy source device 1. The copy destination device 2 is then shifted to an act/resuming state (step S31).

The copy destination device 2 then returns a reply to the copy source device 1 (step S32). The copy source device 1 is then shifted to an act/resuming state (step S33).

The copy source device 1 initiates a merge process only task (corresponding to the bit map acquisition and bit map merger 21 of FIG. 2) (step S34). The copy source device 1 returns a reply to the host 10 in step S29.

(4) Process Flow of the Merge Process Only Task

Figure 10:
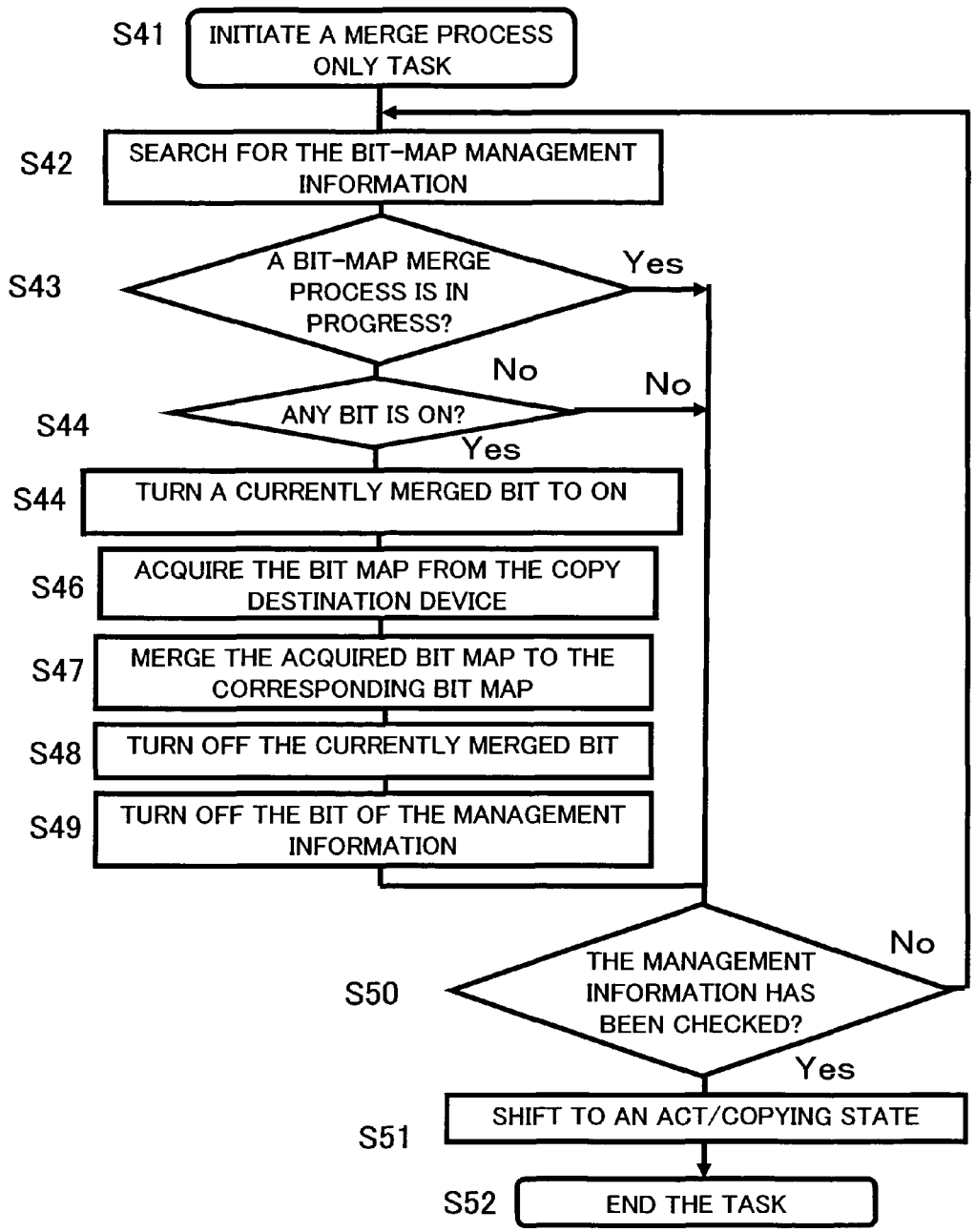
FIG. 10 illustrates a merge process only task according to an embodiment of the present invention.

The process flow of the merge process only task of one embodiment of the present invention is described below with reference to FIG. 10 in view of FIG. 6.

The copy source device 1 initiates the merge process only task (hereinafter simply referred to as the task) (step S41).

The task searches for the bit-map management information acquired from the copy destination device 2 (step S42). Searching for the bit-map management information 4b-1, 4b-2, . . . is started from a top page of the bit map 3a in turn.

The task determines whether a bit-map merge process is in progress (step S43). If it is determined that the bit-map merge process is in progress, processing proceeds to step S50. If it is determined that the bit-map merge process is not in progress, processing proceeds to step S44.

The task determines whether any bit of the management information 4b is on (step S44). If it is determined that any bit of the management information 4b is not on, the merge process is not necessary, and processing proceeds to step S50.

Figure 12:
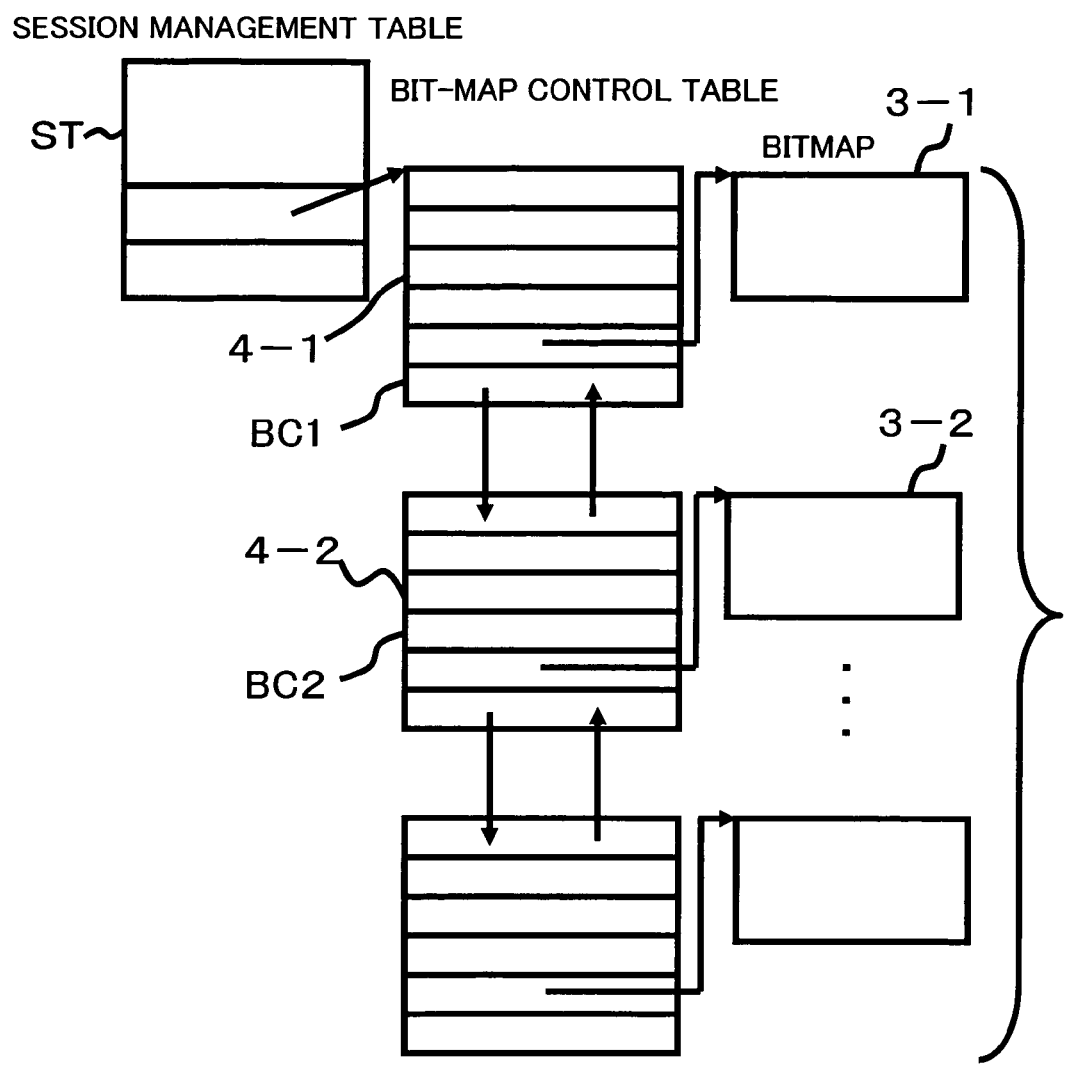
FIG. 12 illustrates formats of a session management table, bit map, and control table of the bit map according to an embodiment of the present invention.
Figure 13:
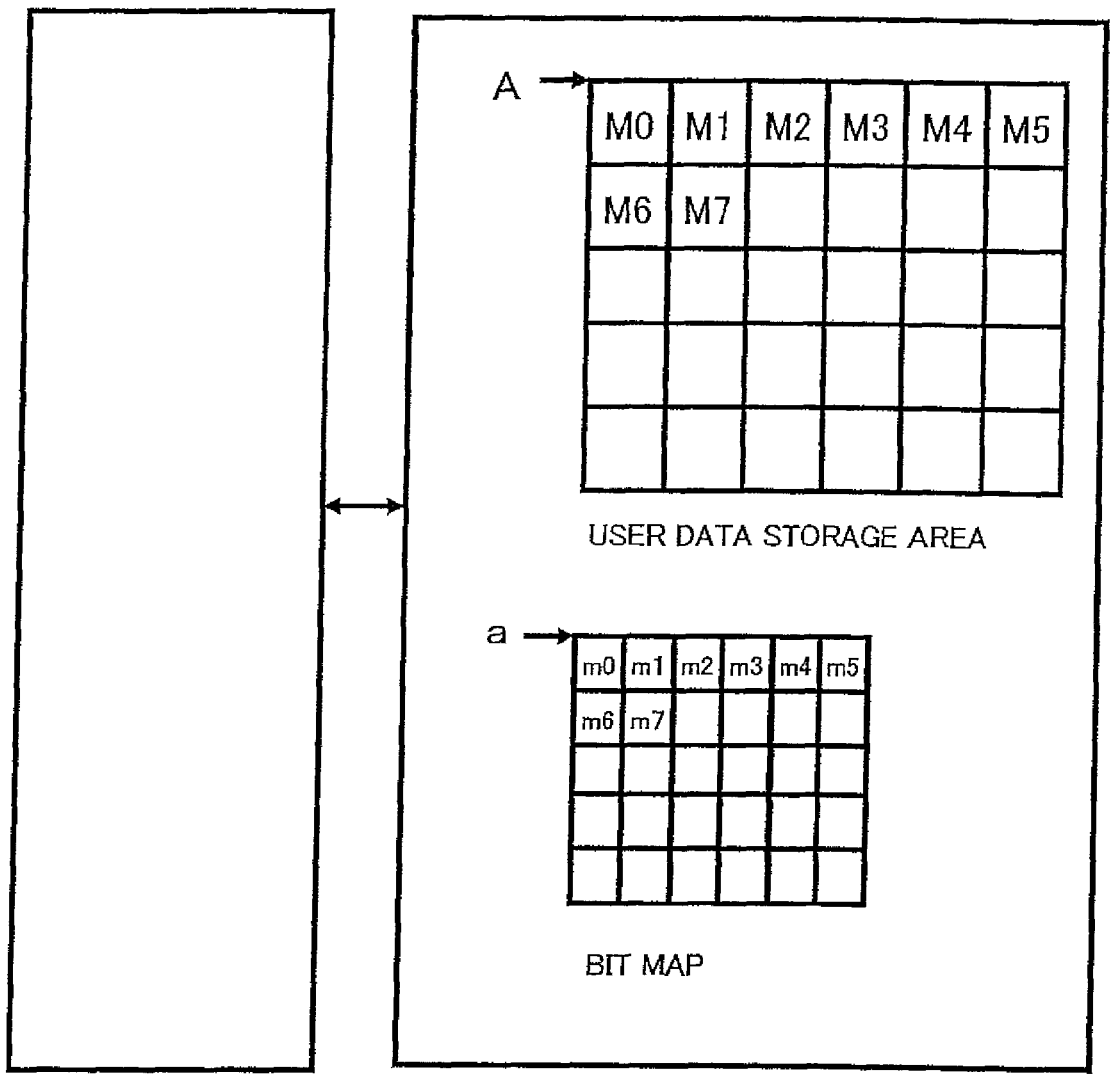
FIG. 13 illustrates a first known example.

If it is determined in step S44 that any bit of the management information 4b is on, a currently merged bit of a flag in a bit-map control table to be discussed later with reference to FIG. 12 is turned to on (step S45).

The task acquires the bit map 3a from the copy destination device 2 (step S46). The task merges the acquired bit map 3a to the corresponding bit map 3b (step S47). The task turns off the currently merged bit in the flag in the bit-map control table (step S48). The copy source device 1 acquires bit map portion corresponding to the turned on bit in the bit map management information 4b because to reduce the size of bit map which the copy destination device 2 transfers to the copy source device 1.

The task turns off the bit of the management information 4b (step S49). The bit-map management information 4b-1 of FIG. 6B illustrates this state.

The task determines whether the management information of all bit-map control information has been checked. If any of the management information remains to be checked, processing returns to step S2 (step S50).

If it is determined that the management information of all bit-map control information has been checked, processing proceeds to step S12 (step S51). Both the copy source device 1 and the copy destination device 2 are shifted to an act/copying state indicating that the merge process has been completed. The task ends (step S52).

(5) Process Flow of the Merge Process

In the known merge process, T bit maps (T being a fixed value depending on apparatus, for example, 7) are transferred at a time. The number of bit maps to be able to be transferred at a time depends on the performance of the copy source device 1 and the copy destination device 2. If the number of bit maps is equal to or less than T, the known method of not using the bit-map management information can process faster than the inventive method of using the bit-map management information 4. For example, the method to be used is selected depending on whether the number of bit maps is above the bit map count T.

Figure 11:
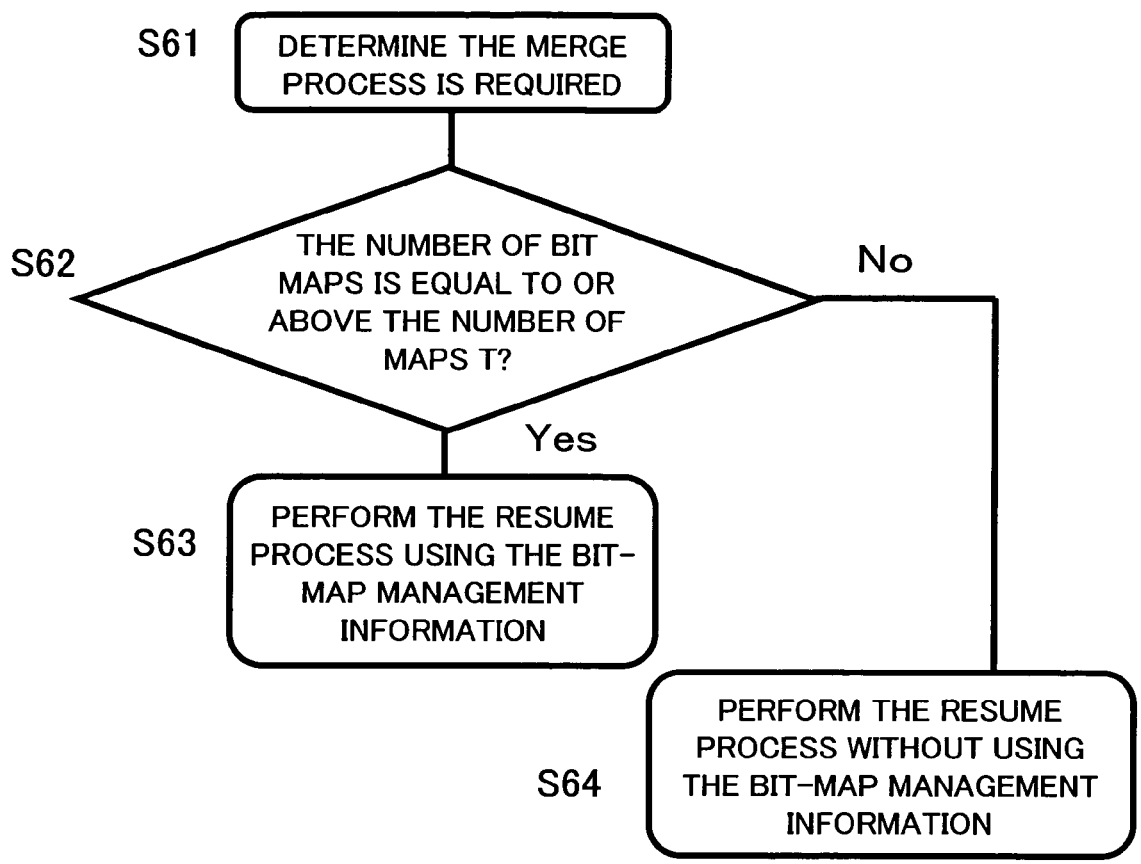
FIG. 11 illustrates a process flow of a merge process determination according to an embodiment of the present invention.

As shown in FIG. 2, the copy destination device 2 is designed to select between the known method of using the bit map information and the inventive method of using the bit-map management information in the rounded form of the bit map. The selection process of merge process is described below with reference to FIG. 11.

The copy destination device 2 determines whether the merge process is required (step S61). The copy destination device 2 determines whether the number of bit maps is equal to or above the number of maps T transferable at a time (step S62).

If it is determined that the number of maps is larger than the number of transferable maps T at a time, the resume process of the embodiments using the bit-map management information 4 is performed (step S63).

If it is determined that the number of bit maps is equal to or less than the number of transferable maps T, the known resume process is performed without using the bit-map management information 4 (step S64).

(6) Session Management Table, Bit Map, and Format of the Table is Described with Reference to FIG. 12

The session management table ST, the bit map 3-1, 3-2, . . . , and the format of the table are described below with reference to FIG. 12.

When the copy session is produced, a session management table ST, bit-map control tables BC1, BC2, . . . and bit maps 3a-1, 3a-2, . . . are arranged as shown in FIG. 12. The number of bit maps 3 of the bit-map control tables BC1, BC2, . . . is determined depending on the copy sizes thereof. The bit-map control tables BC1, BC2, . . . are arranged respectively for the bit maps 3a-1, 3a-2, . . .

Flags for indicating that the corresponding bit map 3 is merged and copy destination bit-map management information for indicating bit map management information 4 in the copy destination device, are written on the bit-map control tables BC1, BC2, . . . . During the merge process, a bit of a corresponding member in a flag is set. As the copy destination bit-map management information, copy destination bit-map management information 4a-1, 4a-2, . . . of FIG. 5 is written, for example.

A front-end address of the bit map control table BC1 is written on the session management table ST. As shown in FIG. 12, addresses are linked. The front-end addresses of the bit maps 3a-1, 3a-2, . . . are written on the bit map control tables BC1, BC2, . . . , respectively.

According to an aspect of the embodiments, the described embodiment processes 20, 21, 41, 42, 43, and 40 are implemented in software and/or computing hardware. Although the described embodiments processes are shown in FIG. 2 as being embodied in a copy source device 1 and a copy destination device 2 as mirrored storage apparatuses and from perspective of storage apparatus 1 being a copy source device and the storage apparatus 2 being a copy destination devices, the embodiments are not limited to such a configuration, and the embodiment processes of 20, 21, 41, 42, 43, and 40 are implemented in all storage apparatuses, such as both storage apparatuses 1 and 2 in the example embodiments, in a mirrored data storage system, including (without limitation) in a Redundant Array of Independent Disks (RAID). Therefore, according to an aspect of the embodiments, a mirrored storage apparatus generates, maintains, and transmits bit map information 3 and/or bit map management information 4 as part of a copy session, including copy suspension and resumption, thereof.

The described embodiment processes are implemented in software and/or computing hardware. An apparatus, method, and computer readable medium according to the embodiments is provided. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An apparatus, comprising:
a first storage device to store user data and comprising:
 a controller to control the first storage device according to a process comprising:
  maintaining bit-map information, the bit-map information including a plurality of bits indicative of locations of the user data, the bit-map information including first flags indicative of updated portions of the user data, the plurality of bits of the bit-map information being divided into a plurality of groups of bits;
  maintaining rounded bit-map information, the rounded bit-map information including a plurality of bits, each bit of the rounded bit-map information being assigned to each group of bits of the bit-map information, the rounded bit-map information including second flags indicating that corresponding groups of bits of the bit-map information include at least one first flag;
a second storage device for communicating with a host, comprising:
 a controller to control the second storage device according to a process comprising:
  maintaining a copy bit-map information indicative of locations of the user data to be copied;
  copying the user data based upon the copy bit-map information to the first storage device;
  receiving the rounded bit-map information maintained in the first storage device, upon receiving a copy resume command to resume the copying;
  acquiring a group of bits of said bit-map information maintained in the first storage device, based upon the rounded bit map information, wherein when a bit of the rounded bit-map information does not include any second flag, a corresponding group of bits of the bit-map information is not acquired; and
  updating the copy of the user data by accessing a location of the user data in the first storage device as indicated by the group of bits of the acquired bit-map information for synchronization of the copy of the user data with the user data in the first storage device.

2. The apparatus according to claim 1, wherein the process of the second storage device controller further comprises:
receiving a copy suspend command to suspend the copying prior to the receiving of the copy resume command.

3. The apparatus according to claim 1, wherein the process of the first storage device controller further comprises:
selecting whether to process the bit map through a bit-map process or a bit-map management information transmission process.

4. A storage device storing one set of information data which is to be in synchronization with that of other storage device, the storage device comprising:
first bit-map information management means for maintaining bit-map information, the bit-map information including a plurality of bits indicative of locations of the user data, the bit-map information including first flags indicative of updated portions of the user data, the plurality of bits of the bit-map information being divided into a plurality of groups of bits;
second bit-map information management means for maintaining rounded bit-map information, the rounded bit-map information including a plurality of bits, each bit of the rounded bit-map information being assigned to each group of bits of the bit-map information, the rounded bit-map information including second flags indicating that corresponding groups of bits of the bit-map information include at least one first flag;
means for acquiring the rounded bit-map information maintained in the other storage device, and based upon the acquired rounded bit-map information, acquiring a group of bits of said bit-map information maintained in the other storage device, based upon the rounded bit map information, wherein when a bit of the rounded bit-map information does not include any second flag, a corresponding group of bits of the bit-map information is not acquired; and
means for updating the user data by accessing the locations of the user data indicated by the group of bits of the acquired bit-map information for synchronization of the user data.

5. A storage device storing one set of user data which is to be in synchronization with that of other storage device, the storage device comprising:
a controller to control the storage device according to a process comprising:
 clearing a bit map in the copy destination device during a suspend mode;
 maintaining bit-map information, the bit-map information including a plurality of bits indicative of locations of the user data, the bit-map information including first flags indicative of updated portions of the user data, the plurality of bits of the bit-map information being divided into a plurality of groups of bits;
 maintaining rounded bit-map information, the rounded bit-map information including a plurality of bits, each bit of the rounded bit-map information being assigned to each group of bits of the bit-map information, the rounded bit-map information including second flags indicating that corresponding groups of bits of the bit-map information include at least one first; flag;
 acquiring the rounded bit-map information maintained in the other storage device, and based upon the acquired rounded bit-map information, acquiring group of bits of said bit-map information maintained in the other storage device, wherein when a bit of the rounded bit-map information does not include any second flag, a corresponding group of bits of the bit-map information is not acquired; and
 updating the user data by accessing the location of the user data indicated by the group of bits of the acquired bit-map information for synchronization of the user data.

6. The storage device according to claim 5, wherein the process of the controller further comprises generating the bit-map information as a bit-map table of rows and columns, and generating the rounded bit-map information indicating updates in the bit-map table on a per row basis of the bit-map information table.

7. A storage method storing one set of information data which is to be in synchronization with that of other storage device, the storage method comprising the steps of:
- maintaining bit-map information, the bit-map information including a plurality of bits indicative of locations of the user data, the bit map information including first flags indicative of updated portion of the user data, the plurality of bits of the bit-map information being divided into a plurality of groups of bits;
- maintaining rounded bit-map information, the rounded bit-map information including a plurality of bits, each bit of the rounded bit-map information being assigned to each group of bits of the bit-map information, the rounded bit-map information including second flags indicating that corresponding groups of bits of the bit-map information include at least one first flag;
- acquiring the rounded bit-map information maintained in the other storage device, and based upon the acquired rounded bit-map information, acquiring a group of bits of said bit-map information maintained in the other storage device, wherein when a bit of the rounded bit-map information does not include any second flag, a corresponding group of bits of the bit-map information is not acquired; and
- updating the user data by accessing the locations of the user data indicated by the group of bits of the acquired bit-map information for synchronization of the user data.

8. A computer-readable recording medium that stores a computer program for storing one set of information data which is to be in synchronization with that of other storage device by controlling a storage device according to a process comprising:
- maintaining bit-map information, the bit-map information including a plurality of bits indicative of locations of the user data, the bit-map information including first flags indicative of updated portion of the user data, the plurality of bits of the bit-map information being divided into a plurality of groups of bits;
- maintaining rounded bit-map information, the rounded bit-map information including a plurality of bits, each bit of the rounded bit-map information being assigned to each group of bits of the bit-map information, the rounded bit-map information including second flags indicating that corresponding groups of bits of the bit-map information include at least one first flag;
- acquiring the rounded bit-map information maintained in the other storage device, and based upon the acquired rounded bit-map information, acquiring a group of bits of said bit-map information maintained in the other storage device, wherein when a bit of the rounded bit-map information does not include any second flag, a corresponding group of bits of the bit-map information is not acquired; and
- updating the user data by accessing the locations of the user data indicated by the group of bits of the acquired bit-map information for synchronization of the user data.

* * * * *

UNITED STATES PATENT AND TRADEMARK OFFICE
CERTIFICATE OF CORRECTION

PATENT NO. : 7,945,749 B2  
APPLICATION NO. : 11/529394  
DATED : May 17, 2011  
INVENTOR(S) : Yoshinari Shinozaki et al.

Page 1 of 1

It is certified that error appears in the above-identified patent and that said Letters Patent is hereby corrected as shown below:

Column 16, Line 48 in Claim 5, delete "first:" and insert -- first --, therefor.

Column 16, Line 52 in Claim 5, before "group" insert -- a --.

Signed and Sealed this
Fifth Day of July, 2011

David J. Kappos
*Director of the United States Patent and Trademark Office*